United States Patent
Ziolkowski et al.

(10) Patent No.: US 8,649,992 B2
(45) Date of Patent: Feb. 11, 2014

(54) METHOD FOR REDUCING INDUCTION NOISE IN TOWED MARINE ELECTROMAGNETIC SURVEY SIGNALS

(75) Inventors: Antoni Marjan Ziolkowski, Edinburgh (GB); Richard Graeme Carson, Pebbles (GB)

(73) Assignee: PGS Geophysical AS, Lysaker (NO)

(*) Notice: Subject to any disclaimer, the term of this patent is extended or adjusted under 35 U.S.C. 154(b) by 1203 days.

(21) Appl. No.: 12/218,638

(22) Filed: Jul. 17, 2008

(65) Prior Publication Data
US 2010/0017133 A1    Jan. 21, 2010

(51) Int. Cl.
*G01C 25/00* (2006.01)
*G01D 18/00* (2006.01)
*G01F 25/00* (2006.01)

(52) U.S. Cl.
USPC ...................................................... 702/104

(58) Field of Classification Search
USPC ................................................... 702/7, 104
See application file for complete search history.

(56) References Cited

U.S. PATENT DOCUMENTS

| | | | |
|---|---|---|---|
| 3,568,048 A * | 3/1971 | Robinson | 324/345 |
| 4,617,518 A | 10/1986 | Srnka | |
| 4,945,309 A | 7/1990 | Spies | |
| H1490 H | 9/1995 | Thompson et al. | |
| 7,286,937 B2 * | 10/2007 | Goswami et al. | 702/11 |
| 7,446,535 B1 * | 11/2008 | Tenghamn et al. | 324/365 |
| 2006/0238200 A1 * | 10/2006 | Johnstad | 324/337 |
| 2006/0250890 A1 * | 11/2006 | van den Berg et al. | 367/24 |
| 2008/0008047 A1 * | 1/2008 | Lunde et al. | 367/154 |
| 2008/0061790 A1 * | 3/2008 | Strack | 324/336 |
| 2008/0144434 A1 * | 6/2008 | Hegna et al. | 367/15 |
| 2009/0140723 A1 * | 6/2009 | Ronaess et al. | 324/202 |

FOREIGN PATENT DOCUMENTS

WO    WO 03/023452    3/2003

OTHER PUBLICATIONS

D.V. Sarwate, M.B. Pursley, "Crosscorrelation properties of pseudorandom and related sequences", 1980, Proceedings of the IEEE, vol. 68, pp. 593-619.
Xinyou Lu, Dennis Willen, Jason Zhang, Ida Gallegos, (2006), "Marine CSEM Data Processing Techniques", SEG Expanded Abstracts, vol. 25, pp. 704-708.
David Wright, Anton Ziolkowski, (2007), "Suppression of Noise in MTEM Data", SEG Expanded Abstracts, vol. 26, pp. 549-553.
Brian R. Spies, (1988), "Local noise prediction filtering for central induction transient electromagnetic sounding", Geophysics, vol. 53, No. 8, pp. 1068-1079.
International Novelty Search Report, Nov. 2, 2009.

* cited by examiner

*Primary Examiner* — Michael Nghiem

(57) ABSTRACT

A method for reducing effect of motion on electromagnetic signals detected while moving an electromagnetic receiver through a body of water includes measuring a parameter related to an amount of current passed through an electromagnetic transmitter to induce an electromagnetic field in subsurface formations. A magnetic field proximate the electromagnetic receiver is measured. A transmitter portion of the measured magnetic field is estimated from the measured parameter. A motion portion of the measured magnetic field is estimated from the measured magnetic field and the estimated transmitter portion. A voltage induced in the receiver is estimated from the estimated motion portion. Signals detected by the receiver are corrected using the estimated voltage.

20 Claims, 4 Drawing Sheets

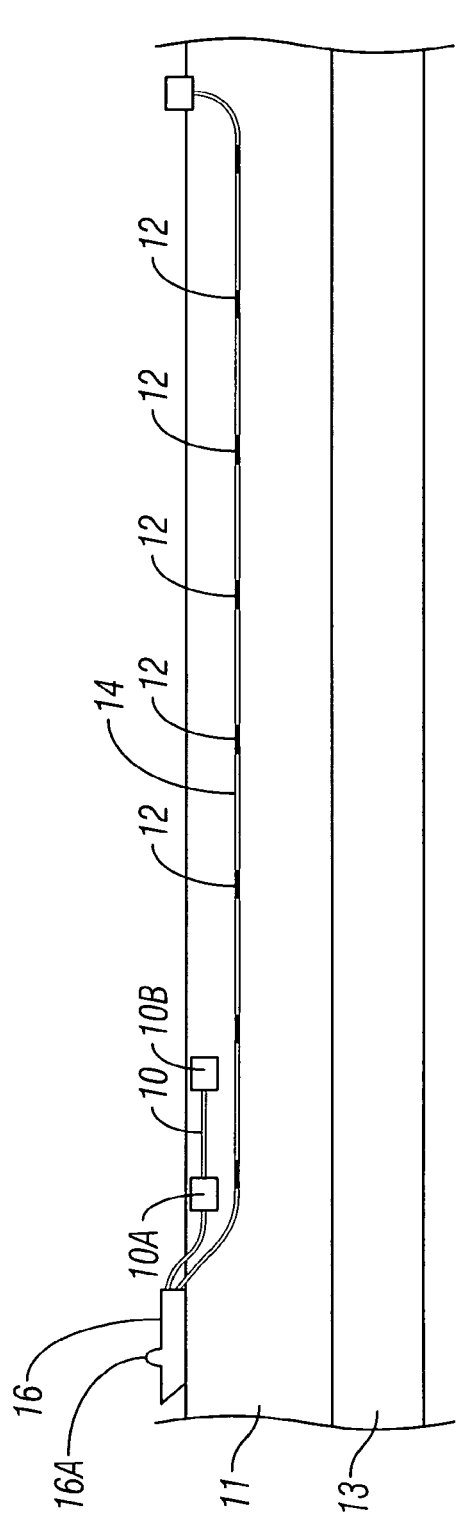
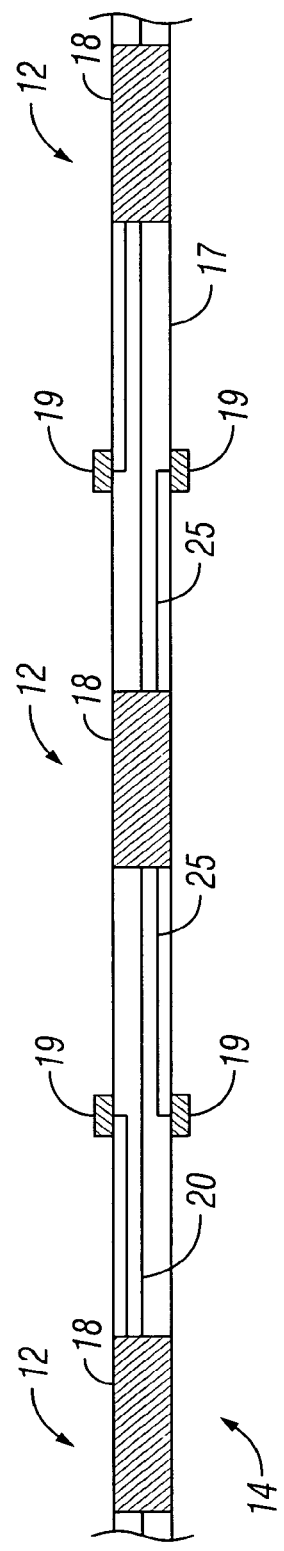
FIG. 1
FIG. 2

METHOD FOR REDUCING INDUCTION NOISE IN TOWED MARINE ELECTROMAGNETIC SURVEY SIGNALS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The invention is related to systems and methods for estimating the response of rock formations in the earth's subsurface to imparted electromagnetic fields in order to determine spatial distribution of electrical properties of the rock formations. More particularly, the invention is related to methods for reducing induction noise caused by sensor movement in a towed marine electromagnetic survey.

2. Description of the Related Art

Porous subsurface sedimentary rock formations are typically saturated with fluids as a result of having been deposited in a body of water during sedimentation. As a result of such deposition, the fluids were initially entirely water. In some subsurface formations the water in the pore spaces has been displaced to some extent after sedimentation by hydrocarbons such as oil and gas. Thus, in some present day subsurface formations, the fluids in their pore spaces may be water, gas or oil, or mixtures of the foregoing.

Detection of formations having less than fully water-saturated pore space, that is, when oil or gas is present in the pore spaces, is of significant economic interest. Certain techniques for detection of such formations include determining existence of electrical resistivities in the subsurface that are anomalously high. The principle of such detection is based on the fact that the flow of electric current through a porous rock formation is related to the fractional volume of the pore spaces with respect to the total rock volume, the spatial configuration of the pore spaces and the electrical properties of the fluids filling the pore spaces. Brine-saturated porous rock formations, for example, are typically much less resistive than the same rock formations having hydrocarbons in some or all of the pore spaces, because brine is a relatively good electrical conductor while hydrocarbons are typically good electrical insulators.

Various techniques for measuring the electrical resistivity of subsurface rock formations are known in the art, for example, time domain electromagnetic survey techniques such as described in International Patent Application Publication No. WO 03/023452. Such techniques in general include imparting an electromagnetic field into the subsurface formations and measuring electric and/or magnetic fields induced in the subsurface formation in response to the imparted electromagnetic field. For such measurement techniques, the electromagnetic field may be imparted using an electric field transmitter, for example, by passing an electric current through a bipole electrode pair. Alternatively a magnetic field transmitter may be used, for example, passing an electric current through a wire loop or a plurality of such loops. The receivers used to detect the responsive electromagnetic fields may be bipole electrode pairs for measuring potential differences (electric field potential), or may be wire loops, pluralities of wire loops or magnetometers for measuring magnetic field amplitude and/or the time derivatives of magnetic field amplitude. The electric current used to impart the electromagnetic field may be controlled to provide a step change in the current.

Step change in the transmitter current induces what are referred to as "transient" electromagnetic fields, and the responses measured by the receivers are related to transient response of the formations in the earth's subsurface. Step change in the transmitter current may be obtained by switching the current on, switching the current off, reversing polarity, or combinations of the foregoing. A particularly advantageous form of transmitter current switching configuration used to impart the electromagnetic field is a so called "pseudo-random binary sequence" (PRBS).

In surveying an area of the subsurface using electromagnetic techniques, it is desirable to obtain signals corresponding to various distances ("offsets") between the transmitter and receiver. In a typical survey implementation using PBRS transmitter current switching, a different bandwidth PRBS can be used for different ranges of offset. In one such example, for surveying formations below the bottom of a body of water, a receiver vessel may deploy a plurality of receivers in a selected pattern, such as a line array, on the water bottom. A separate transmitter vessel may deploy the transmitter on or at a nominal distance from the water bottom. The transmitter may be actuated and signals from the receivers recorded. Electromagnetic signals corresponding to various offsets may be obtained by moving the transmitter vessel, actuating the transmitter, and recording signals from the receivers, successively. The transmitter current is measured during actuation and the measurements thereof can then be transmitted to the receiver vessel for data quality control and processing.

To survey different areas of the earth's subsurface below the water bottom, the receiver vessel may withdraw the receivers from the water bottom, move to a different location, and once again deploy the receivers on the water bottom in a different location. The above-described transmitter deployment, transmitter actuation and signal recording may then be repeated. It is desirable to improve efficiency with which marine electromagnetic signals are obtained. It has been proposed to tow the receivers during recording of a survey using the transmitter vessel or a different vessel, thus enabling surveying relatively large areas of the subsurface without the need to repeatedly deploy and withdraw receiver cables from the water bottom. In order to enable such towed surveying it is desirable to have a method for reducing the effect of voltages induced in the receiver signals resulting from motion of the receiver cables in the water.

SUMMARY OF THE INVENTION

One aspect of the invention is a method for reducing effect of motion on electromagnetic signals detected while moving an electromagnetic receiver through a body of water. A method according to this aspect of the invention includes measuring a parameter related to an amount of current passed through an electromagnetic transmitter to induce an electromagnetic field in subsurface formations. A magnetic field proximate the electromagnetic receiver is measured. A transmitter portion of the measured magnetic field is estimated from the measured parameter. A motion portion of the measured magnetic field is estimated from the measured magnetic field and the estimated transmitter portion. A voltage induced in the receiver is estimated from the estimated motion portion. Signals detected by the receiver are corrected using the estimated voltage.

A method for marine electromagnetic surveying according to another aspect of the invention includes towing at least one electromagnetic transmitter and at least one electromagnetic receiver through a body of water. At selected times an electric current is passed through the at least one transmitter to induce an electromagnetic field in formations below the bottom of the body of water. A parameter related to an amount of the current passed through at least one transmitter is measured. A magnetic field proximate the at least one electromagnetic receiver is measured. A transmitter portion of the measured magnetic field is estimated from the measured parameter. A motion portion of the measured magnetic field is estimated from the measured magnetic field and the estimated transmitter portion. A voltage induced in the at least one receiver is estimated from the estimated motion portion. Signals detected by the at least one receiver are corrected using the estimated voltage.

Other aspects and advantages of the invention will become apparent from the description and the claims that follow.

BRIEF DESCRIPTION OF THE DRAWINGS

FIG. 1 shows an example towed marine electromagnetic survey system.

FIG. 2 shows a receiver cable in the system of FIG. 1 in more detail.

DETAILED DESCRIPTION

Figure 3:
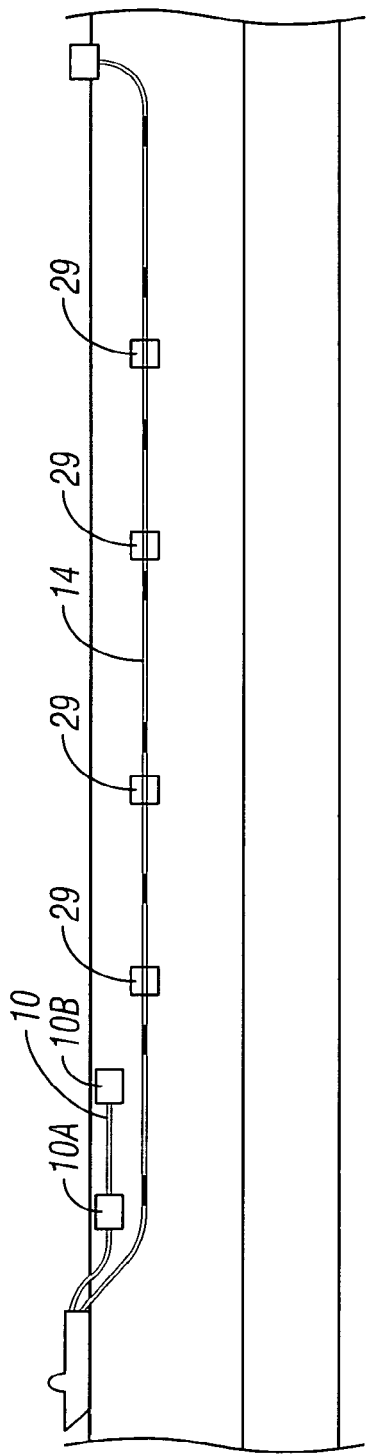
FIG. 3 shows an alternative receiver cable.

The present invention has as a purpose improving the quality of marine electromagnetic survey measurements made using a survey system in which both the transmitter and receivers are towed.

FIG. 1 shows an example of a marine electromagnetic survey system that may be used to implement the invention. In the system shown in FIG. 1, an electromagnetic transmitter cable 10 and a plurality of receivers 12 disposed within a receiver cable 14 are towed behind a survey vessel 16 along a body of water 11 such as a lake or the ocean. The transmitter 10 may be, for example, an electrode bi-pole, including two spaced apart electrodes 10A, 10B along an insulated, reinforced electrical cable. The transmitter could also be a magnetic field source such as one or more wire loops (not shown). Equipment disposed on the vessel 16, shown generally at 16A and referred to for convenience as a "recording system" may include circuits (not shown separately) arranged to pass electric current through the transmitter 10, e.g., the electrodes 10A, 10B at selected times. The current may have any transient-type waveform, including, for example, switching direct current on, switching direct current off, changing direct current polarity, or switching current in a pseudo-random binary sequence. The transmitter current may also be continuous wave having one or more discrete frequencies. Other circuits (not shown) detect voltages induced in the various receivers 12 on the receiver cable 14 and can make a recording with respect to time of the voltages induced in each receiver 12. Typically such recordings will be indexed with respect to particular switching events in the transmitter current waveform. Transient electromagnetic fields produced by passing the current through the transmitter 10 travel through the water 11, and through formations 13 below the water bottom. Electromagnetic fields induced in response are detected by the receivers 12 on the receiver cable 14. The various signals may be interpreted to infer the spatial distribution of electrical conductivity in the formations 13.

A portion of the receiver cable 14 may be observed in more detail in FIG. 2. The receiver cable 14 has a flexible outer sleeve 17 that may be filled with non-conducting liquid such as oil or kerosene, or with a gel-like material such as is known in the art to be used to fill certain types of marine seismic streamers. Each receiver 12 may include a signal processing module 18 and may be configured to measure a voltage imparted across spaced apart pairs of electrodes 19 coupled to the module 18 as shown. Alternatively, the receivers 12 may be configured to measure voltage induced in one or more wire loops or magnetometers (not shown) for measuring magnetic field and/or the time derivative of the magnetic field. The electrodes 19 (or magnetic field sensing devices) may be coupled to the respective signal processing modules using electrode cables 25. A power and communications cable 20 may provide electrical power such as from the vessel (16 in FIG. 1) for powering the various circuits in the signal processing modules 18 and providing a communications path to transfer signals representing the measurements to a remote location, such as the recording system (16A in FIG. 1). It is contemplated that the signal processing modules 18 will include suitable preamplification and signal conditioning devices (not shown) and may include devices (not shown) for converting analog voltage measurements into digital signals for communication along the communications cable 20, however, the foregoing are not intended to limit the scope of the invention. The signal processing modules 18 and associated electrodes 19 may be arranged as shown in FIG. 2 so that the electrodes 19 from adjacent modules 18 are in the same axial position along the receiver cable 14, however, such arrangement is not a limit on the scope of this invention.

The example transmitter and receivers shown in FIGS. 1 and 2 are horizontal electric bi-poles. As explained above, magnetic field sensing devices and transmitters may also be used in electromagnetic surveying according to the invention. It should also be understood that vertical bi-poles may be used in accordance with the invention.

The method of the invention is based on the assumption that the total magnetic field, represented by H(t), of the Earth, as experienced in the water at each of the receivers (12 in FIG. 1) is essentially uniform in space, that is, the Earth's magnetic field does not vary significantly over the length of the receiver bipole, although it does vary with time due to magnetotelluric effects. The receiver cable 14 is composed of electrical conductors moving within the Earth's magnetic field H(t) with a determinable velocity v(t). Assuming that the spatial distribution of the receiver cable 14 changes slowly with respect to time, v(t) will be a slowly varying function. The Earth magnetic field induced voltage noise at each receiver 12 is proportional to the rate of change of magnetic flux, which is proportional to the product of the Earth's magnetic field H(t) and the component of the receiver cable velocity vector that is perpendicular to the Earth's magnetic field.

In order to reduce the effects of the induced field voltage noise in a towed electromagnetic receiver 12, three principal time-varying quantities can be measured: a parameter related to the current I(t) applied to the transmitter (10 in FIG. 1), the voltage V(t) measured at the receiver, and three orthogonal components of the induced magnetic field $HI_x(t)$, $HI_y(t)$, and $HI_z(t)$ at one or more positions along the receiver cable (14 in FIG. 1). The transmitter current I(t) should be measured as close to the transmitter (10 in FIG. 1) as possible. Such measurement can be performed using any suitable device for example a magnetometer, which can measure the magnetic field induced by the transmitter.

Figure 4:
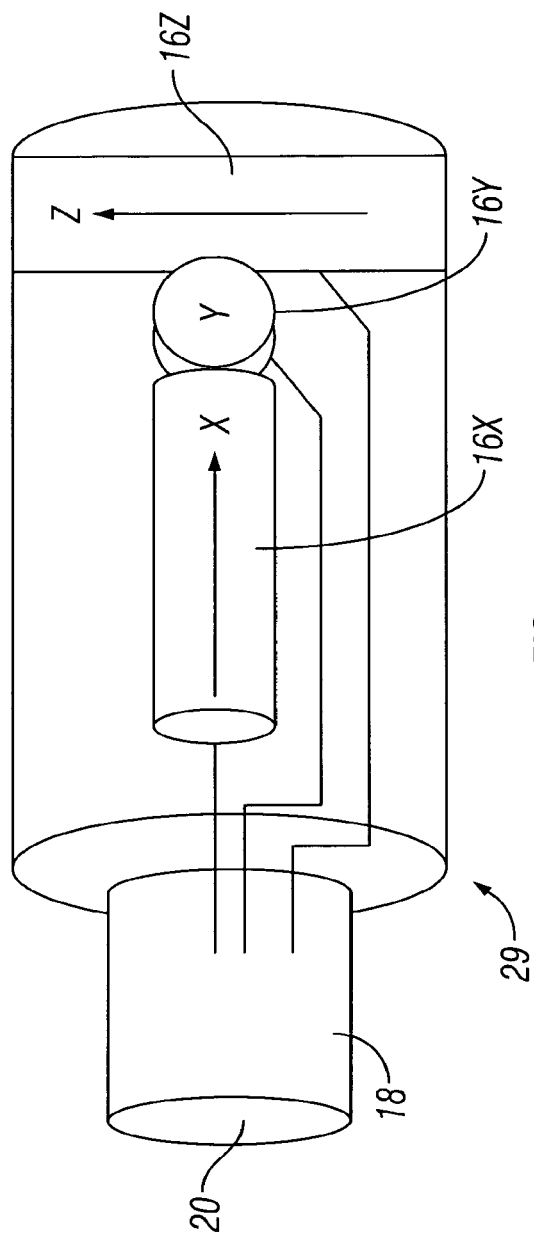
FIG. 4 shows a receiver module of the cable shown in FIG. 3 including a magnetic field sensor.

FIG. 3 shows a type of a receiver cable 14 in the system of FIG. 1 in which magnetic field sensors 29 may be disposed along the receiver cable 14 at selected positions. FIG. 4 shows an example of the magnetic field sensors 29, in which may be included three orthogonal induction coils 16X, 16Y, 16Z (i.e., wire coils) that measure voltages induced by each of three respective orthogonal field components of the induced magnetic field.

Figure 5:
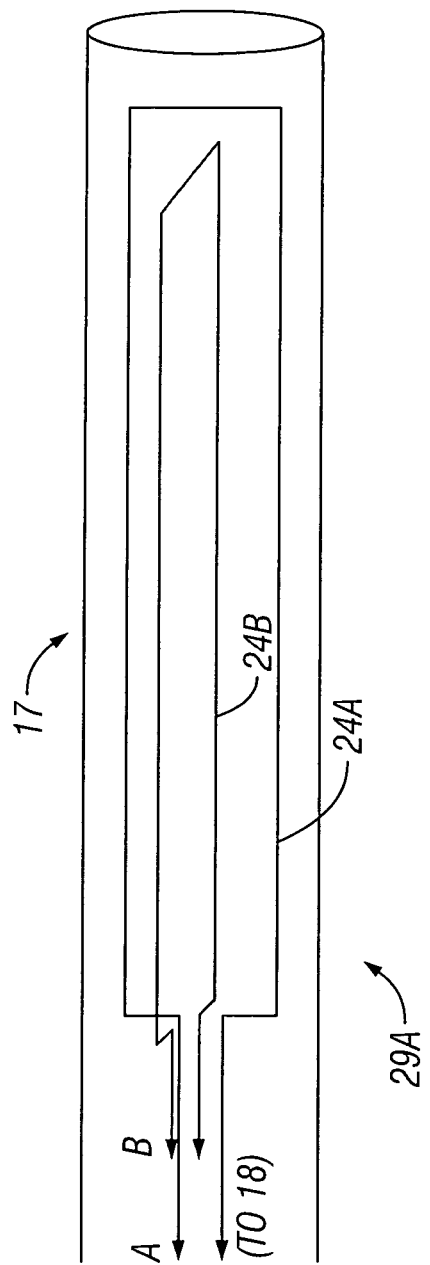
FIG. 5 shows another example of a magnetic field sensor.

Another possible implementation of the magnetic field sensor is to use two elongated, mutually perpendicular wire loops inside the receiver cable, as indicated schematically at 24A and 24B in FIG. 5. In the example magnetic field sensor 29A shown in FIG. 5, each mutually perpendicular wire loop 24A, 24B can be substantially rectangular, having a long dimension oriented along the length of the cable. The wire loops 24A, 24B will substantially follow the motion of the receiver cable and the electrical conductors inside. The voltage induced in each wire loop 24A, 24B will be proportional to the rate of change of the magnetic field perpendicular to plane of the respective wire loop 24A, 24B. In the example of FIG. 5, only two such loops may be used.

While there are a number of possible implementations for making the required magnetic field measurements, the analysis below is for the most general case, in which three orthogonal measurements are used, as may be obtained using the magnetic field sensor shown in FIG. 4.

Assuming that three orthogonal components of the magnetic field are measured, such as by using the sensor example shown in FIG. 4, the measured magnetic field components, represented by $HI_x(t)$, $HI_y(t)$, and $HI_z(t)$ each corresponds to the measurements made by the respective wire coil (16X, 16Y, 16Z in FIG. 4) in each magnetic field sensor (29 in FIG. 4). Each measured component, $HI_x(t)$, $HI_y(t)$, and $HI_z(t)$ contains a portion that arises purely from the transmitter, and another portion that arises from the rate of change of magnetic flux caused by the receiver cable moving in the magnetic field H(t). That is:

$$HI_x(t)=HIS_x(t)+HIM_x(t)$$

$$HI_y(t)=HIS_y(t)+HIM_y(t)$$

$$HI_z(t)=HIS_z(t)+HIM_z(t) \quad (1)$$

in which $HIS_x(t)$, $HIS_y(t)$, and $HIS_z(t)$ are the measured magnetic field components caused by the transmitter's magnetic field, and $HIM_x(t)$, $HIM_y(t)$, and $HIM_z(t)$ are the magnetic field components due to the receiver cable moving within the earth's magnetic field. There will also be a portion of the measured magnetic field that results from the response of the Earth's subsurface to the electromagnetic field imparted by the transmitter (10 in FIG. 1) but the amplitude of such portion is expected to be small enough to be ignored for the purposes of implementing the present method.

The magnetic field of the transmitter is proportional to the transmitter current I(t), so the transmitter magnetic field components may be represented as follows:

$$HIS_x(t)=k_xI(t)$$

$$HIS_y(t)=k_yI(t)$$

$$HIS_z(t)=k_zI(t), \quad (2)$$

in which $k_x$, $k_y$, and $k_z$ are factors that depend on the transmitter geometry. The voltage V(t) induced in each of the receivers (12 in FIG. 1) is composed of two portions:

$$V(t)=VS(t)+VI(t) \quad (3)$$

in which VS(t) is the response of the Earth's subsurface to the electromagnetic field caused by the current I(t) input to the transmitter and which is the desired signal being measured), and VI(t) is the induction noise caused by movement of the receiver cable (14 in FIG. 1).

Figure 6:
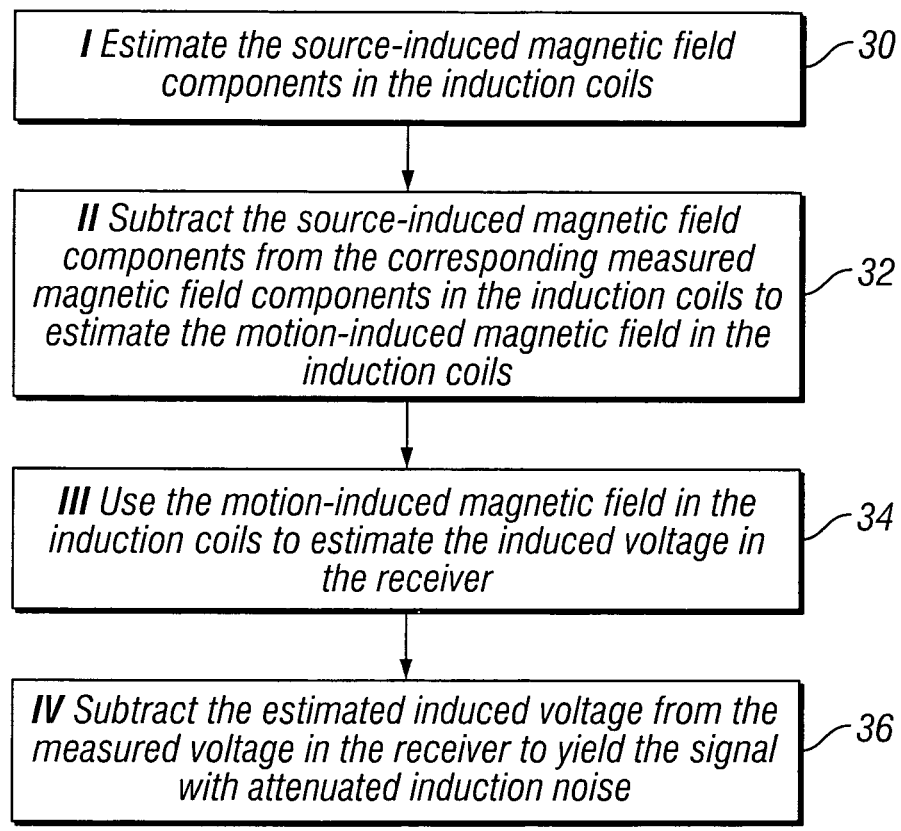
FIG. 6 shows a flow chart of an example implementation of a method of the invention.

FIG. 6 shows a flow chart illustrating an example process to attenuate the movement induction noise. The example process includes the following: (I) at 30, estimating the transmitter-induced magnetic field components $HIS_x(t)$, $HIS_y(t)$, and $HIS_z(t)$ using, for example, equation (2); (II) at 32, subtracting the estimated transmitter-induced magnetic field components $HIS_x(t)$, $HIS_y(t)$, and $HIS_z(t)$ from the magnetic field measurements $HI_x(t)$, $HI_y(t)$, and $HI_z(t)$ to estimate the motion induced magnetic field components $HIM_x(t)$, $HIM_y(t)$, and $HIM_z(t)$; (III) at 34, using the estimated motion induced magnetic field components $HIM_x(t)$, $HIM_y(t)$, and $HIM_z(t)$ to estimate the motion induced voltage in the measured receiver signals VI(t). Once the motion induced voltage is predicted, (IV) at 36, the estimated motion inducted voltage VI(t) can be subtracted from the measured voltage V(t) to provide VS(t), which is the voltage induced in the receivers (12 in FIG. 1) by the response of subsurface formations to the imparted electromagnetic field. The foregoing process elements will be reviewed in more detail below.

I: The transmitter magnetic field portion $HIS_x(t)$ of the magnetic field component measurement $HI_x(t)$ (referred to as the X component measurement) is related to the transmitter current I(t) according to the first element of equation (2). Such relationship can be treated mathematically as a filtering problem. That is, a filter could be found, for example a Wiener filter, that best estimates the portion of the measured magnetic field component $HI_x(t)$ that is correlated with the transmitter current I(t). Convolution of the foregoing filter with the transmitter current I(t) provides a representation of the transmitter's magnetic field portion of the measured magnetic field component $HIS_x(t)$. The filter may be expected to be close to an impulse at time zero (t=0). Similar filters may be derived for the Y and Z component measurements of the transmitter's magnetic field portion of the magnetic field measurement.

II: For the X component measurement of the measured magnetic field, the transmitter magnetic field portion of the measured magnetic field $HIS_x(t)$ determined as explained above can then be subtracted from the total magnetic field measurement $HI_x(t)$ to provide the motion portion of the magnetic field $HIM_x(t)$. Similarly, for the Y and Z component magnetic field measurements, $HIS_y(t)$ can be subtracted from $HI_y(t)$ to yield $HIM_y(t)$ and $HIS_z(t)$ can be subtracted from $HI_z(t)$ to provide $HIM_z(t)$.

III: The X, Y and Z motion induced magnetic field components determined above in II, namely, $HIM_x(t)$, $HIM_y(t)$ and $HIM_z(t)$, are three orthogonal components of the induced magnetic field vector HIM(t). Provided that the direction of the magnetic field with respect to the receiver cable (14 in FIG. 1) does not substantially change during signal acquisition, the three motion induced magnetic field components will have the same waveform, but may have different amplitudes. Depending on the direction of the Earth's magnetic field with respect to the various magnetic field sensors (29 in FIGS. 4 and 29A in FIG. 5), it is possible that any one of these components might happen to be zero for some portion or all of the signal recording interval. For such reason, it is preferable to use the magnetic field sensor shown in FIG. 4 having all three orthogonal measurement components. Because all three motion induced magnetic field components should have substantially the same waveform, the components can be summed to determine what may be referred to as a "pilot trace" that is non-zero if there is motion induced noise in the receiver signals. Such pilot trace may be represented by the expression:

$$HP(t) = HIM_x(t) + HIM_x(t) + HIM_x(t) \quad (4)$$

The pilot trace may be correlated with the induced noise in the measurement V(t), and so a filter, f(t), can be found that best estimates the component of V(t) that is correlated with HP(t). The filter may be a Wiener filter. Convolution of the filter f(t) with the pilot trace HP(t) provides an estimate of the motion induced noise:

$$HP(t)*f(t) = VI(t) \quad (5)$$

IV: The motion induced noise determined above in III can be subtracted from the voltage measurements V(t) made by the receivers (12 in FIG. 1) to provide corrected voltage measurements, which may be substantially uncontaminated by motion induced noise. In practice, the process described above would be repeated for the measurements made by each of the plurality of receivers (12 in FIG. 1) on the receiver cable (14 in FIG. 1).

The analysis described above can be implemented using any suitable software or hardware and in any computer-based system, for example a conventional general-purpose processor or any dedicated processor programmed or configured to process the received signals using the input signals in accordance with the invention.

A method according to the invention may provide marine transient electromagnetic signals from the Earth's subsurface that can be obtained while a receiver cable is moving through the water. Such measurements may be made substantially more efficiently than by deploying receiver cables on the bottom of a body of water.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reducing effect of motion on electromagnetic signals detected while moving an electromagnetic receiver through a body of water, comprising:
    towing a transmitter cable comprising an electromagnetic transmitter through the body of water;
    towing a separate receiver cable comprising the electromagnetic receiver through the body of water
    measuring a parameter related to an amount of current passed through the electromagnetic transmitter, wherein the measuring is done as close to the electromagnetic transmitter as possible;
    measuring a magnetic field proximate the electromagnetic receiver, wherein the measuring a magnetic field proximate the receiver comprises measuring voltage induced in three mutually orthogonal wire coils;
    estimating a transmitter portion of the measured magnetic field from the measured parameter related to the amount of current;
    estimating a motion portion of the measured magnetic field from the estimated transmitter portion of the measured magnetic field;
    estimating a voltage induced in the receiver from the estimated motion portion of the measured magnetic field; and
    correcting voltage signals detected by the receiver using the estimated voltage.

2. The method of claim 1 wherein the parameter related to an amount of current comprises magnetic field proximate the electromagnetic transmitter.

3. The method of claim 1 wherein the electromagnetic transmitter comprises a bipole electrode.

4. The method of claim 1 wherein the electromagnetic receiver comprises a bipole electrode.

5. The method of claim 1 wherein the measuring a magnetic field proximate the receiver comprises measuring voltage induced in at least one wire loop.

6. The method of claim 5 wherein the measuring a magnetic field proximate the receiver comprises measuring voltage induced in at least two orthogonal wire loops.

7. The method of claim 1 wherein the estimating the voltage induced by the estimated motion portion comprises determining a filter that best estimates a component of the receiver signals that is correlated with the motion portion of the measured magnetic field.

8. The method of claim 7 wherein the filter comprises a Wiener filter.

9. The method of claim 1 wherein the estimating a transmitter portion of the magnetic field from the magnetic field measurements comprises determining a filter that best estimates a portion of the measured magnetic field that is correlated with the current passed through the electromagnetic transmitter.

10. The method of claim 9 wherein the filter comprises a Wiener filter.

11. A method for marine electromagnetic surveying, comprising:
    towing a transmitter cable comprising at least one electromagnetic transmitter and a separate receiver cable comprising at least one electromagnetic receiver through a body of water;
    at selected times passing an electric current through the at least one transmitter to induce an electromagnetic field in formations below the bottom of the body of water;
    detecting signals at the at least one receiver in response to the induced electromagnetic field;
    measuring a parameter related to an amount of the current passed through at least one transmitter, wherein the measuring is done as close to the at least one transmitter as possible;
    measuring a magnetic field proximate the at least one electromagnetic receiver, wherein the measuring a magnetic field proximate the at least one receiver comprises measuring voltage induced in three mutually orthogonal wire coils;
    estimating a transmitter portion of the measured magnetic field from the measured parameter related to the amount of current;
    estimating a motion portion of the measured magnetic field from the estimated, transmitter portion of the measured magnetic field;
    estimating a voltage induced in the at least one receiver from the estimated motion portion of the measured magnetic field; and
    correcting the voltage signals detected by the at east one receiver using the estimated voltage.

12. The method of claim 11 wherein the parameter related to an amount of current comprises magnetic field proximate the electromagnetic transmitter.

13. The, method of claim 11 wherein the signals detected by the receiver comprise voltage imparted across a bipole electrode.

14. The method of claim 11 wherein the imparting the electromagnetic field comprises passing the electric current across a bipole, electrode.

15. The method of claim 11 wherein the measuring a magnetic field proximate the at least one receiver comprises measuring voltage induced in at least one wire loop.

16. The method of claim 15 wherein the measuring a magnetic field proximate the at least one receiver comprises measuring voltage induced in at least two orthogonal wire loops.

17. The method of claim 15 wherein the estimating the voltage induced by the estimated motion portion comprises determining a filter that best estimates a portion of the receiver signals that is cross correlated with the motion portion of the measured magnetic field.

18. The method of claim 17 wherein the filter comprises a Wiener filter.

19. The method of claim 11 wherein the estimating a transmitter portion of the magnetic field from the magnetic field measurements comprises determining a filter that best estimates a portion of the measured magnetic field that is correlated with the current passed through the electromagnetic transmitter.

20. The method of claim 19 wherein the filter comprises a Wiener filter.

* * * * *